(No Model.)
A. HEINZELMAN & N. MEYLER.
MACHINE FOR BENDING AND CUTTING METALLIC ROOFING PLATES.
No. 429,809. Patented June 10, 1890.
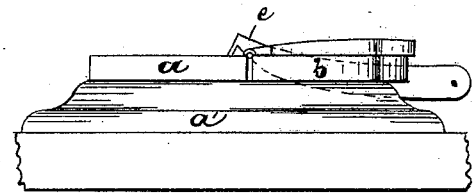
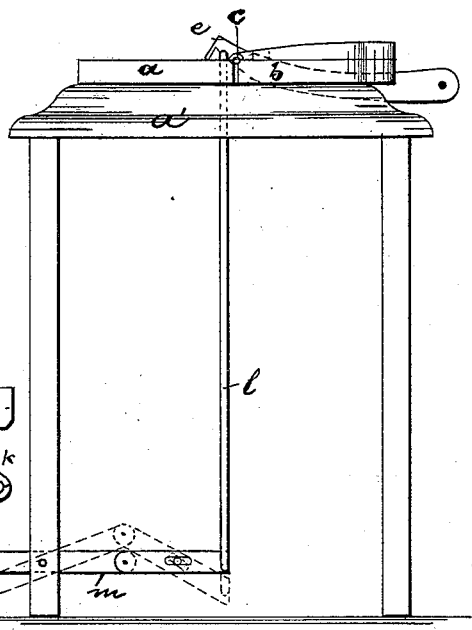
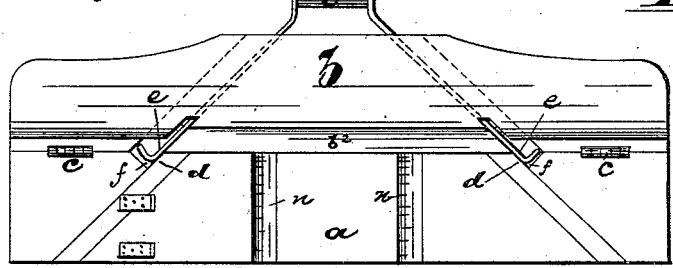
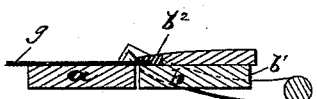
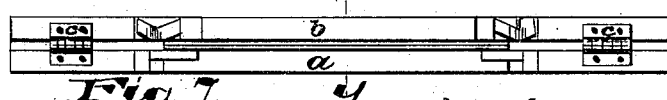
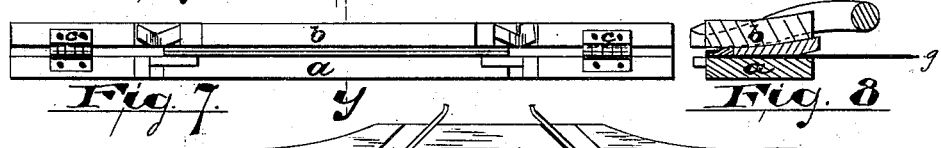
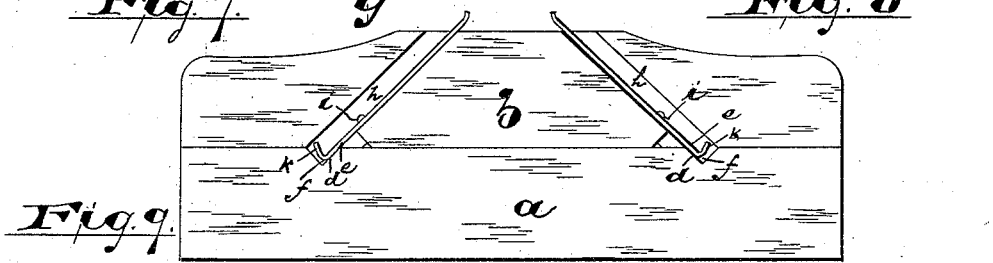
WITNESSES: Oscar A. Michel, E. L. Shuman
INVENTOR: Andrew Heinzelman, Nicholas Meyler, BY Drake & Co. ATTY'S.
THE NORRIS PETERS CO., PHOTO-LITHO., WASHINGTON, D. C.

United States Patent Office.

ANDREW HEINZELMAN AND NICHOLAS MEYLER, OF NEWARK, NEW JERSEY.

MACHINE FOR BENDING AND CUTTING METALLIC ROOFING-PLATES.

SPECIFICATION forming part of Letters Patent No. 429,809, dated June 10, 1890.

Application filed October 17, 1889. Serial No. 327,296. (No model.)

*To all whom it may concern:*

Be it known that we, ANDREW HEINZELMAN and NICHOLAS MEYLER, citizens of the United States, residing at Newark, in the county of Essex and State of New Jersey, have invented certain new and useful Improvements in Machines for Bending and Cutting Metallic Roofing-Plates; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the preparation of tin or sheet-metal plates for roofing purposes by bending the edges of said plates and cutting the corners thereof on a miter in the usual manner simultaneously or by the one movement of the hand, or while the plate is in the one position arranged to undergo the cutting and bending operations. Heretofore in the preparation of such plates prior to fixing them on the roof the same have first been cut by hand with ordinary shears at the corners and then bent over along the edges to interlap with the adjacent roof-plates. This involved considerable extra time and trouble, which is saved by the use of our invention.

The invention consists in the improved cutting and bending machine and in the arrangement and combination of parts thereof, substantially as will hereinafter be set forth, and finally embodied in the clauses of the claim.

Referring to the accompanying drawings, in which like letters indicate corresponding parts in each of the several figures, Figure 1 is a side elevation of the improved device fixed to a table and ready to be operated by hand. Fig. 2 is a similar view of the machine adapted to be employed in connection with foot-power apparatus. Figs. 3 and 4 are detail views of a knife or cutter to be employed with co-operating cutters in the operation of cutting the corners of the plates. Fig. 5 is a plan of the machine. Fig. 6 is a section of the same, taken on line $x$. Fig. 7 is a view showing the inner edges when the hinged sections are closed together. Fig. 8 is a section of the same, taken on line $y$; and Fig. 9 is an under side plan of the device.

In said drawings, $a$ indicates one of the hinged sections of the device, which is adapted to be rigidly and securely fixed to a bed plate or table $a'$ in any ordinary manner.

$b$ is a movable section secured to the fixed section by hinges $c\ c$, which latter allow the said movable section to be turned from the position shown in Fig. 6 to that shown in Fig. 8, as will be clearly understood. The said fixed section $a$ is provided with cutters $d\ d$, arranged near the ends thereof, which co-operate with movable cutters $e\ e$ on the movable plate, the said cutters $d\ d$ being arranged at or approximately at right angles to one another, as shown in Fig. 5, so as to simultaneously miter the opposite corners of the tin roofing-plate, as will be understood. The said fixed section is recessed at the side of the fixed cutters $d$, as at $f$, to receive the movable cutters $e$ and allow them to work in the operation of shearing the roofing-plate.

The movable section $b$ is or may be composed of two parts $b'\ b^2$, Fig. 6, between which is formed a recess of about the thickness of the roofing-plate $g$, to receive the edge of said plate, as shown in Fig. 6, and turn the same, as shown in Fig. 8, so that the said plate is prepared to interlock with the next adjacent plate on the roof.

On the under side of the movable plate $b$ the same is grooved or recessed, as at $h\ h$, to receive the co-operating cutters $e$. Said cutters $e\ e$ extend into shearing engagement with the fixed cutters $d\ d$, are fulcrumed at $i\ i$ on the movable section $b$, and extend to a common handle $j$, which lies a little away from the outer edge of the section $b$ to a position convenient to be grasped by the hand. The cutting-edges of the cutters $e\ e$ extend up through the recesses in the sections $b\ b$, so as to allow the roofing-plates, when they are passed into the bending-recess between the parts $b'\ b^2$ to pass at the same time beneath the said cutters $e$.

The roofing-plate being in position, the operator grasps the handle $j$ and raises the same toward him. By this action the cutting-edges effect a shearing action, cutting the opposite corners of the tin roofing-plate. The cutters then strike against the under side of the section b and the latter is raised, turning on the hinges and at the same time bending the plate. Thus by one action of the operator the two operations may be formed simultaneously or in immediate succession.

We may perform the cutting by foot-power, and to that end we have provided the cutters e with ears k k, by which connecting-rods l, Fig. 2, may be fastened to said cutters and the latter thus be connected to a treadle or foot-lever m in any ordinary manner. By drawing down the movable cutters with the foot the mitering is effected.

In the construction shown in Fig. 2 the bending is effected by hand.

Suitable recesses n may be made in the fixed plate a to receive the bent edges first made on opposite sides of the plate while forming the subsequently-bent edges, and suitable guides o o may be provided to guide the roofing-plate into position to be cut.

Having thus described the invention, what we claim as new is—

1. In combination, sections a b, hinged together, one of which is provided with fixed cutters and the other with a recess to receive the edge of the plate and movable cutters for trimming the corners of said plate, substantially as set forth.

2. In combination, the section a, recessed section b, hinged to the section a and adapted to receive and bend the edge of the tin plate, and cutters e e, fulcrumed on the section b and arranged at right angles to one another, and means for operating said cutters, substantially as set forth.

In testimony that we claim the foregoing we have hereunto set our hands this 12th day of October, 1889.

ANDREW HEINZELMAN.
NICHOLAS MEYLER.

Witnesses:
CHARLES H. PELL,
OSCAR A. MICHEL.